T. D. STANLEY.
LOCK FOR STEERING WHEELS.
APPLICATION FILED NOV. 17, 1919.
1,395,609.
Patented Nov. 1, 1921.
2 SHEETS—SHEET 1.
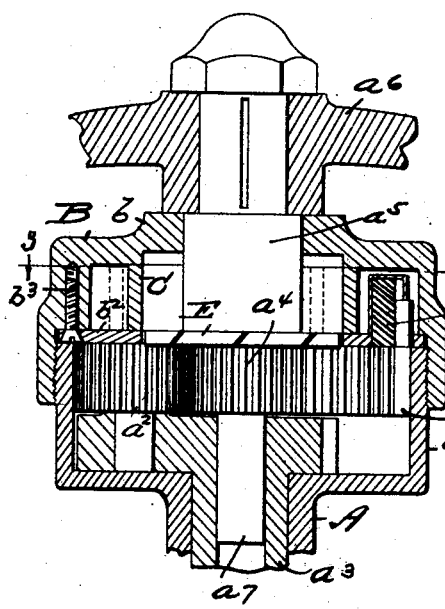
Fig. 1.
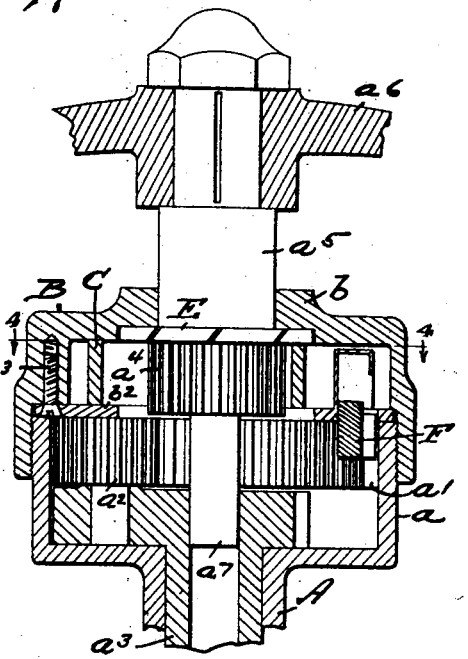
Fig. 2.
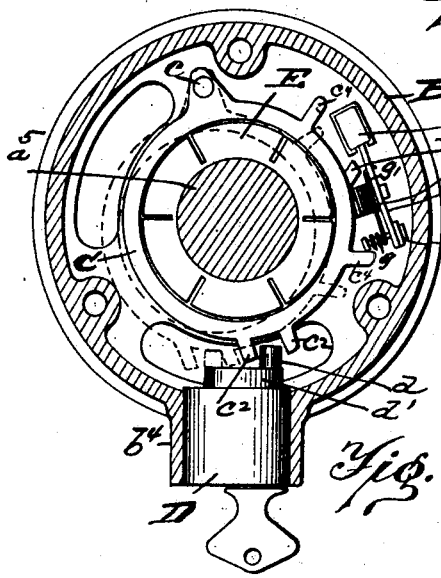
Fig. 3.
Fig. 4.
Inventor
Theodore D. Stanley
By
Attorney

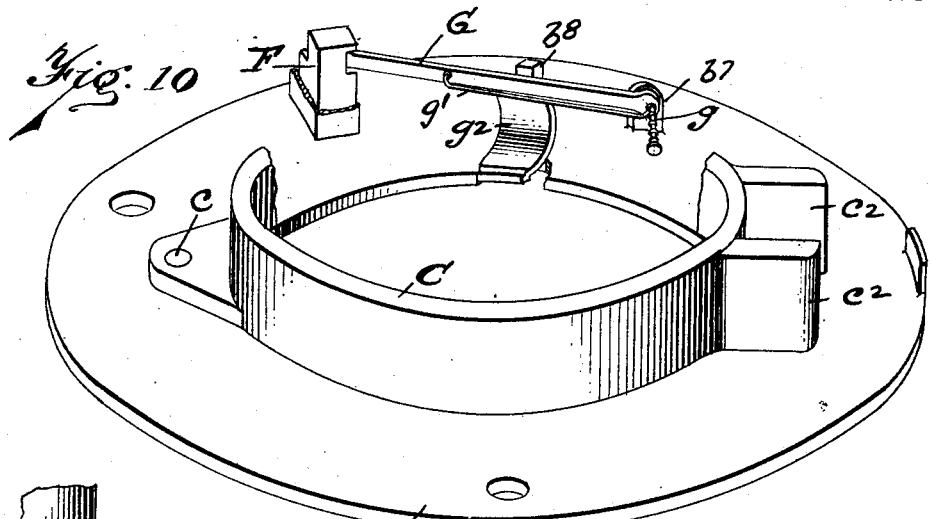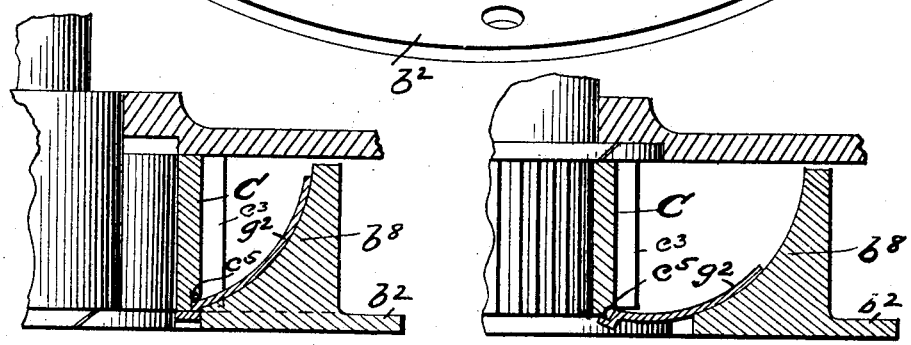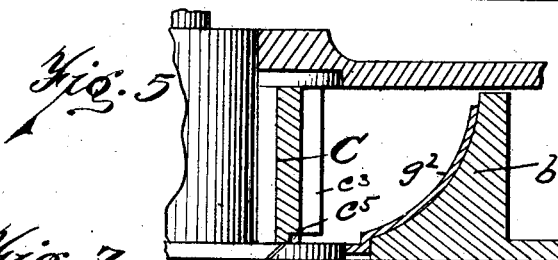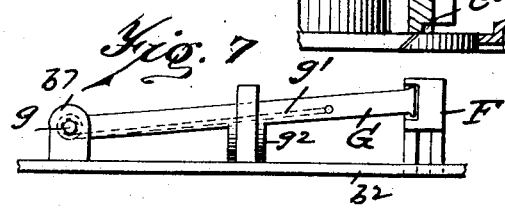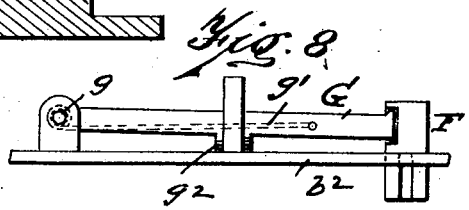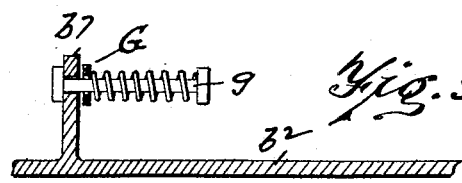

UNITED STATES PATENT OFFICE.

THEODORE D. STANLEY, OF DETROIT, MICHIGAN, ASSIGNOR TO LELAND LOCK COMPANY, OF DETROIT, MICHIGAN, A CORPORATION OF MICHIGAN.

LOCK FOR STEERING-WHEELS.

1,395,609.  Specification of Letters Patent.  Patented Nov. 1, 1921.

Application filed November 17, 1919. Serial No. 338,616.

*To all whom it may concern:*

Be it known that I, THEODORE D. STANLEY, citizen of the United States, residing at Detroit, county of Wayne, State of Michigan, have invented a certain new and useful Improvement in Locks for Steering-Wheels, and declare the following to be a full, clear, and exact description of the same, such as will enable others skilled in the art to which it pertains to make and use the same, reference being had to the accompanying drawings, which form a part of this specification.

This invention relates to locks for automobile steering wheels and to an arrangement thereof whereby the device is readily applied to a steering wheel mechanism of well known type without particular alteration or change of the latter, the invention providing means which holds the steering wheel in inoperative relation to the steering stem or shaft when desired, and prevents unlawful tampering with machine.

The invention consists in the matter hereinafter set forth and more particularly pointed out in the appended claims.

In the drawings:

Figure 1 is a view in longitudinal section with parts in elevation of the upper portion of a steering wheel mechanism equipped with a steering wheel lock that embodies features of the invention, the parts being shown with a steering wheel in operative position.

Fig. 2 is a view in longitudinal section of the same parts showing the wheel locked in inoperative position.

Fig. 3 is a view in transverse section taken on or about line 3—3 of Fig. 1, the position assumed by a locking ring when the parts are in inoperative position being indicated by a dotted figure.

Fig. 4 is a view in section taken on or about line 4—4 of Fig. 3.

Fig. 5 is a view in detail, greatly enlarged, showing a locking lever latch with the parts in operative position.

Fig. 6 is a similar view showing the locking lever latch or finger when the parts are in inoperative position.

Fig. 7 is a view in detail of a locking lever in the position assumed when the steering wheel is engaged with the steering spindle.

Fig. 8 is a view in detail showing the lever in position assumed when the steering wheel is detached.

Fig. 9 is a view in detail of the locking lever fulcrum pin.

Fig. 10 is a view in detail, greatly enlarged and partially broken away, of a cover base and locking ring with associated cover lock block and lever.

Referring to the drawings, a steering column A, of the usual type is enlarged at the upper end or at least provided with a casing $a$ which houses an internal gear $a^1$ made fast to the casing and planetary pinions $a^2$ in mesh with the internal gear, and mounted to drive a steering wheel post $a^3$ when they themselves are turned by a driving gear $a^4$, the latter in turn being manipulated through a spindle $a^5$ and steering wheel $a^6$. This disposition of the planetary pinion driving gear and casing is that of a familiar type of steering mechanism and does not in itself form a part of the invention, but the spindle $a^5$ has a pilot $a^7$ journaled in the steering wheel post $a^3$ and permitting longitudinal withdrawal of the spindle $a^5$ into the position shown in Fig. 2, with the gear $a^4$ out of mesh with the pinions $a^2$.

The spindle $a^5$ extends through a central boss $b$ of a cover B, which is screwed or otherwise secured on the casing $a$. A centrally apertured base plate $b^2$ is secured as by screws $b^3$ in the cover B, to provide support for a locking ring C, which is oscillatory on a pivot pin $c$ so that it may be swung eccentrically to the axis of the shaft $a^5$ as by the ward $d$ of a barrel $d^1$ which forms part of a lock D, mounted in a lateral boss $b^4$ of a cover B, the ward $d$ lying between a pair of lugs $c^2$, of the ring.

A mutilated washer E on the shaft $a^5$ acts as a thrust bearing which seats in a recess of the cover B, when the shaft is withdrawn axially into the position shown in Fig. 2 and the ring C, swung under the washer, so as to hold the gear $a^4$ free from the planetary pinions $a^2$. The mutilating or slotting of the washer E, is not necessary but is preferable as it prevents any shifting of the ring C, by driving down of the shaft $a^5$ by end blows when the gear is raised into inoperative position.

To avoid withdrawal of the cover B, and consequent tampering with the mechanism, a latch or detent block F, is slidable in parallel relation to the shaft $a^5$, or substantially so, in a boss of the cover base $b^2$.

A latch lever G, is loosely pivoted on a pin $g$ mounted in the lug $b^7$ of the base plate $b^2$ with the otherwise free end entering a transverse slot in the block F, a suitably disposed spring $g^1$ forcing the lever downward so that a segmental finger $g^2$ which cams on a lug $b^8$ of the base plate $b^2$, is kept constantly under the recessed margin $c^5$ of the ring C as the latter is swung across the base $b^2$ by the lock,—a projecting lug $c^3$ on the ring overlapping the finger $g^2$ when in the position shown in Fig. 4. This movement of the lever G, permits the block F, to interlock with the internal gear in the case A, and thereby to hold the cover securely in place against unlawful removal when the mechanism is inoperative.

Lugs $c^4$ integral with the ring C, are provided to support that portion of the ring overlapping the opening in the base plate $b^2$ when the ring is swung eccentrically to the axis of the shaft $a^5$.

One of the features of the invention is the peculiarly disposed locking lever, which forces the latch block of the cover into engagement with the internal gear teeth in the casing and thus locks the cover in place with the locking ring shifted, the motion of the lever preventing any jarring loose or any tampering with the device.

As a result of this construction a lock is obtained which is readily mounted on a steering post of conventional type, effectively holds the wheel in inoperative position, and is sightly while extremely efficient in operation.

Obviously changes in the detail of the construction may be made without departing from the spirit of the invention and I do not limit myself to any particular form or arrangement of parts within the scope of the appended claims.

I claim:—

1. In a steering wheel locking device for automobiles, a casing and cover for housing the gearing of an automobile steering mechanism, a locking ring housed with the gearing and adapted when moved from concentric relation to the main shaft of the steering device to hold the gearing inoperative, a block reciprocatable upwardly and downwardly on the cover controlled by the locking ring and adapted to be shifted downwardly into engagement with the casing to retain the cover thereon when the locking ring is moved from concentric position and a lock on the cover adapted to operate the locking ring.

2. In a steering wheel locking device for automobiles, a main steering shaft, a casing and cover around the shaft, gearing for operating the shaft housed by the casing and cover, a locking ring normally eccentric with the steering shaft housed with the gearing and adapted when moved from concentric to eccentric position to hold the gearing inoperative, a block reciprocatable upwardly and downwardly on the cover and movable downwardly to engage the casing to lock the cover thereon, and a lever pivoted on the cover and cammed to move on its pivot longitudinally thereof and also transversely to its pivot plane of motion to reciprocate the block and connections between the lever and the gear lock ring to shift the lever when the ring is moved.

3. In a steering wheel locking device for automobiles, a main steering shaft, a casing and cover around the shaft, gearing for operating the shaft housed by the casing and cover, a locking ring normally eccentric with the steering shaft housed with the gearing adapted when moved from concentric to eccentric position to hold the gearing inoperative, a block reciprocatable upwardly and downwardly in the cover and movable downwardly to engage the casing to lock the cover thereon when moved into the casing, a lever pivoted to the cover with the free end thereof engaging the block to shift the latter, a spring for moving the lever in one direction, a curved finger on the lever abutting the ring, and a lug on the cover against which the curved finger cams, the lug and spring coöperating to impart a rocking motion to the lever on the pivot thereof and a sliding movement longitudinally of the pivot to permit the lever finger to follow the locking ring when the latter is shifted and to project the block into engagement with the casing.

4. In a locking device for steering wheel gears of automobiles, a locking member, and a lever operatively connected with and controlling the locking member and mounted for pivoted movement and also mounted for movement in a curved path lying in a plane transverse to the normal plane of oscillation of the lever.

5. In a locking device for automobiles, a locking member, and a lever operatively connected with the locking member and pivotally mounted and also mounted for movement in a path lying in a plane transverse to the normal plane of oscillation of the lever.

6. In a locking device for steering wheel gears of automobiles, a locking member, and a lever operatively connected with the locking member and mounted for pivotal movement and also for movement in a path lying in a plane transverse to the normal plane of oscillation of the lever.

7. In a steering wheel locking device for automobiles, a casing, a main shaft concentric with the casing, an annular gear secured in the casing, planet pinions engaging the gear and operatively connected with the main shaft, an axially shiftable driving gear adapted to be moved in and out of mesh with the planet pinions, a cover detachably secured on the casing, a base plate for the cover through which the main gear is movable, a locking ring normally eccentric with the shaft pivoted on the cover base to swing beneath the main gear when the latter is withdrawn from mesh with the pinions, a block reciprocatable through the base plate adapted to interlock with the annular gear, a spring operated lever pivoted on the base plate with the otherwise free end engaging the block to project the same, said lever also having a sliding movement longitudinally of its pivot, a curved finger on the lever abutting the ring and a cam lug on the base plate adapted to swing the lever in a curved path transverse to the plane of its oscillation whereby the block is moved into interlocked relation with the internal gear when the lever finger follows the locking ring as the latter is shifted.

In testimony whereof, I sign this specification in the presence of two witnesses.

THEODORE D. STANLEY.

Witnesses:
SAMUEL E. THOMAS,
LOUIS F. HAWKINS.